United States Patent
Papstein, II et al.

(10) Patent No.: US 12,028,953 B2
(45) Date of Patent: *Jul. 2, 2024

(54) CENTRAL REPORTING FOR LIFE SAFETY EQUIPMENT

(71) Applicant: HLI Solutions, Inc., Greenville, SC (US)

(72) Inventors: Robert Richard Papstein, II, Greenville, SC (US); Allen George Cyr, Greenville, SC (US)

(73) Assignee: HLI SOLUTIONS, INC., Greenville, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/122,986

(22) Filed: Mar. 17, 2023

(65) Prior Publication Data

US 2023/0254960 A1  Aug. 10, 2023

Related U.S. Application Data

(63) Continuation of application No. 17/384,243, filed on Jul. 23, 2021, now Pat. No. 11,612,046.

(60) Provisional application No. 63/055,451, filed on Jul. 23, 2020.

(51) Int. Cl.
*H05B 47/19* (2020.01)
*G08B 7/06* (2006.01)
*G08B 25/10* (2006.01)
*G08B 29/12* (2006.01)
(Continued)

(52) U.S. Cl.
CPC .............. *H05B 47/20* (2020.01); *G08B 7/062* (2013.01); *G08B 25/10* (2013.01); *G08B 29/126* (2013.01); *H05B 47/175* (2020.01)

(58) Field of Classification Search
CPC ...... H05B 47/00; H05B 47/20; H05B 47/175; H05B 47/19; H05B 47/22; F21S 9/02; F21S 9/022; F21S 9/024; H02J 9/02; H02J 9/065

See application file for complete search history.

(56) References Cited

U.S. PATENT DOCUMENTS 10,775,009 B2    9/2020  Cyr et al.
2002/0080027 A1*  6/2002  Conley, III ............ H05B 47/19
                                                      340/332
(Continued)

OTHER PUBLICATIONS

Information Disclosure Statement dated Nov. 1, 2021 which was filed in connection with U.S. Appl. No. 17/384,243.

(Continued)

*Primary Examiner* — Thai Pham
(74) *Attorney, Agent, or Firm* — Buckley, Maschoff & Talwalkar LLC

(57) ABSTRACT

An emergency lighting system that includes a storage device, an emergency lighting device, an area control device and an external device. The emergency lighting device includes a light, a first controller having a first electronic processor configured to perform a self-diagnostic test, and a first input/output (I/O) device configured to transmit data associated with the self-diagnostic test. The area control device includes a second I/O device configured to receive data associated with the first self-diagnostic test form the first I/O device and transmit the data associated with the self-diagnostic test to the storage device.

20 Claims, 9 Drawing Sheets

(51) Int. Cl.
*H05B 47/175* (2020.01)
*H05B 47/20* (2020.01)

(56) References Cited

U.S. PATENT DOCUMENTS

| | | | | |
|---|---|---|---|---|
| 2013/0193847 A1* | 8/2013 | Recker | ............... | H05B 47/28 |
| | | | | 315/86 |
| 2014/0320011 A1* | 10/2014 | Hegarty | ............... | G09F 13/22 |
| | | | | 315/132 |
| 2016/0309570 A1* | 10/2016 | Han | ............... | H05B 45/10 |
| 2018/0073696 A1 | 3/2018 | Cyr et al. | | |
| 2019/0027958 A1* | 1/2019 | Kuo | ............... | H05B 47/17 |
| 2019/0326777 A1* | 10/2019 | Hariz | ............... | G08B 29/12 |

OTHER PUBLICATIONS

Information Disclosure Statement dated Jan. 24, 2022 which was filed in connection with U.S. Appl. No. 17/384,243.
PCT/US2021/043008 International Search Report and Written Opinion dated Oct. 20, 2021 (21 pages).
892 Form dated Feb. 8, 2022 which was received in connection with U.S. Appl. No. 17/384,243.
Notice of Allowance dated Oct. 5, 2022 which was received in connection with U.S. Appl. No. 17/384,243.

\* cited by examiner

CENTRAL REPORTING FOR LIFE SAFETY EQUIPMENT

RELATED APPLICATIONS

This application is a continuation of U.S. patent application Ser. No. 17/384,243, filed on Jul. 23, 2021 which claims the benefit of U.S. Provisional Patent Application No. 63/055,451, filed Jul. 23, 2020, the entire content of which is hereby incorporated by reference.

FIELD

Embodiments relate to emergency lighting systems.

SUMMARY

Emergency lighting devices, such as exit signs and remote light fixtures, are commonly used in public buildings to indicate and illuminate areas such as stairs and exits in the event of a power failure. These fixtures may have an emergency backup power system, such as a battery, that automatically turns on the emergency light when the primary power source is interrupted. Once an emergency lighting device is installed, it must be tested periodically to make sure it is functioning properly. Determining whether each emergency lighting device included in an emergency lighting system has been tested may be costly and time consuming.

One aspect of the present disclosure provides an emergency lighting system that includes a storage device, an emergency lighting device, an area control device, and an external device. The emergency lighting device includes a light, a first controller having a first electronic processor configured to perform a self-diagnostic test, and a first input/output (I/O) device configured to transmit data associated with the self-diagnostic test. The area control device includes a second I/O device configured to receive data associated with the first self-diagnostic test form the first I/O device and transmit the data associated with the self-diagnostic test to the storage device.

Another aspect of the present disclosure provides a method of operating an emergency lighting system that includes a storage device, an emergency lighting device, an area control device, and an external device. The method includes performing, by a controller having an electronic processor included in the emergency lighting device, a self-diagnostic test; and transmitting, by a first input/output (I/O) device included in the emergency lighting device, data associated with the self-diagnostic test to a second I/O device included in the area control device. The method further includes transmitting, by the second I/O device, the data associated with the self-diagnostic test to the storage device.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used, broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would, recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the present disclosure will become apparent by consideration of the detailed description and accompanying drawings.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Figure 1:
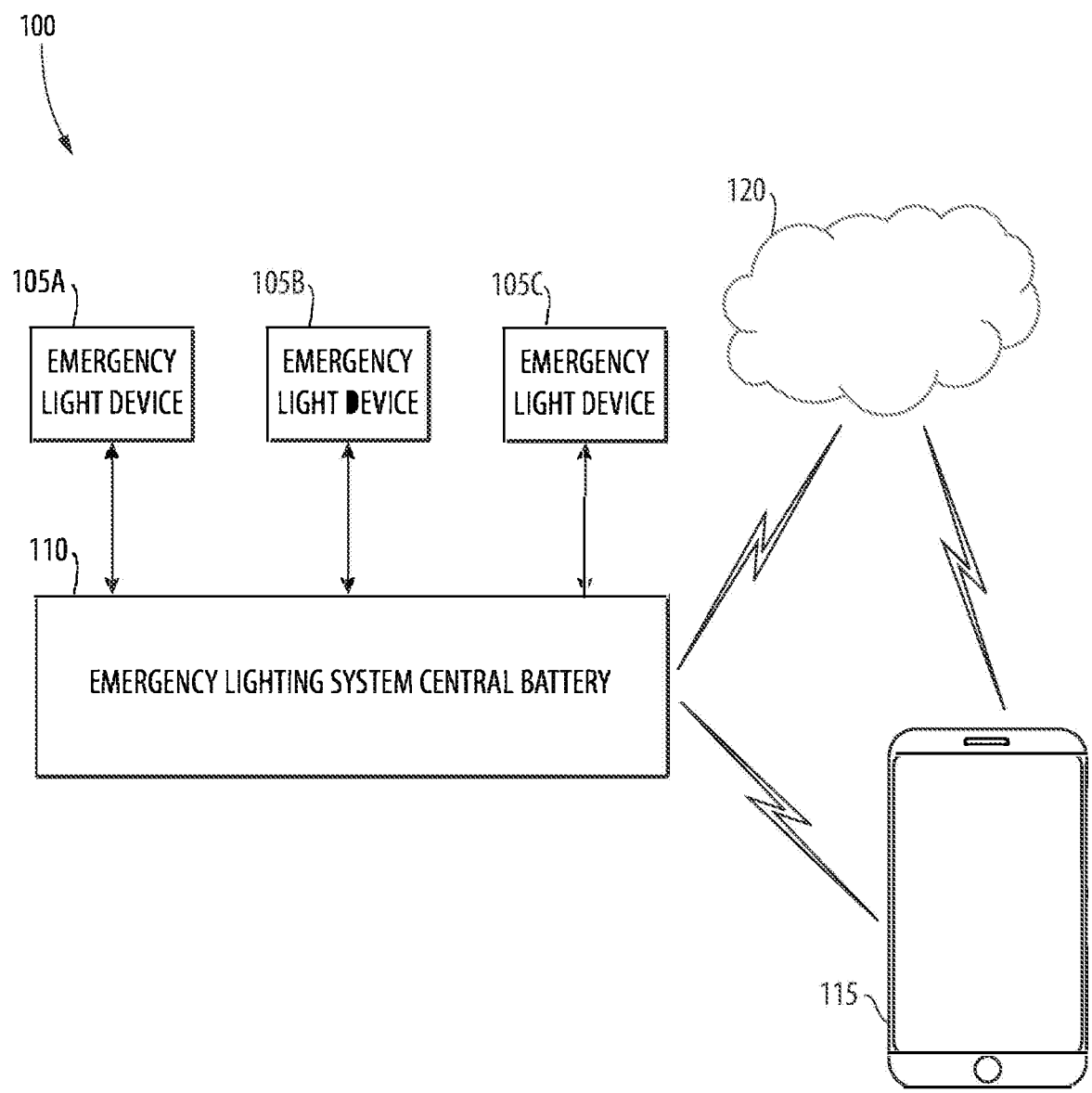
FIG. 1 is a schematic view of an emergency lighting system according to some embodiments.

FIG. 1 is a schematic view of an emergency lighting system 100. The emergency lighting system 100 includes, among other things, a plurality of emergency lighting devices 105A-105C, an area control device 110, an external device 115, and a storage device 120. Although shown as including three emergency lighting devices 105A-105C, it should be understood that emergency lighting system 100 may include any number of emergency lighting devices 105A-105N as desired (for example, 10, 20, 50, etc.). Likewise, it should be understood that any of the other components included in emergency lighting system 100 are not limited to what is shown in FIG. 1.

Figure 2A:
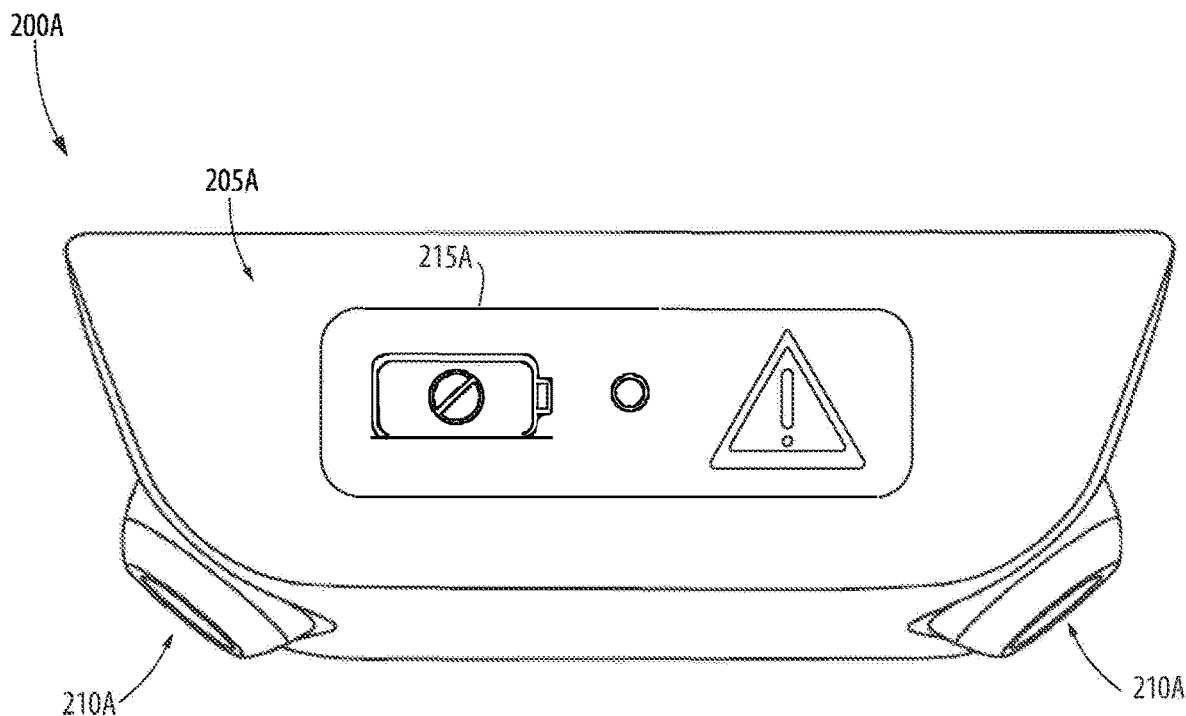
FIGS. 2A and 2B illustrate emergency lighting devices included in the emergency lighting system of FIG. 1 according to some embodiments.
Figure 2B:
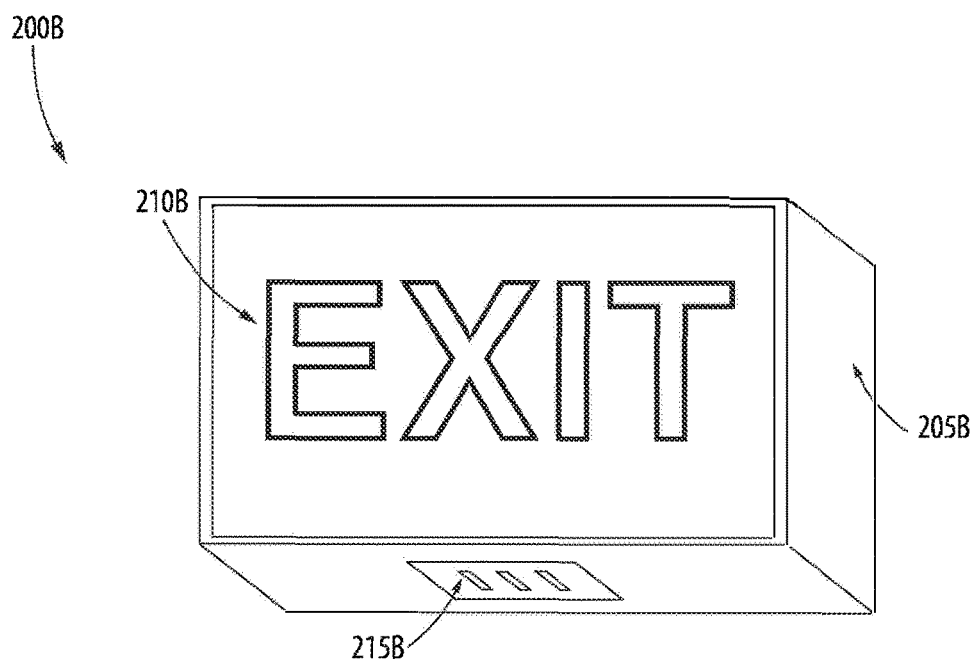

FIGS. 2A and 2B show exemplary embodiments of an emergency lighting device 105. As shown in FIG. 2A, emergency lighting device 105 may be implemented as a remote emergency light 200A. The remote emergency light 200A may include, among other things, a housing 205A, a pair of light emitters 210A, and a plurality of indicators 215A. The plurality of indicators 215A may be used to display a condition of the remote emergency light 200A. As shown in FIG. 2B, the emergency lighting device 105 may also be implemented as an emergency exit lighting device 200B. The emergency lighting device 200B may include, among other things, a housing 205B, one or more light emitters 210B, and a plurality of indicators 215B.

Figure 3:
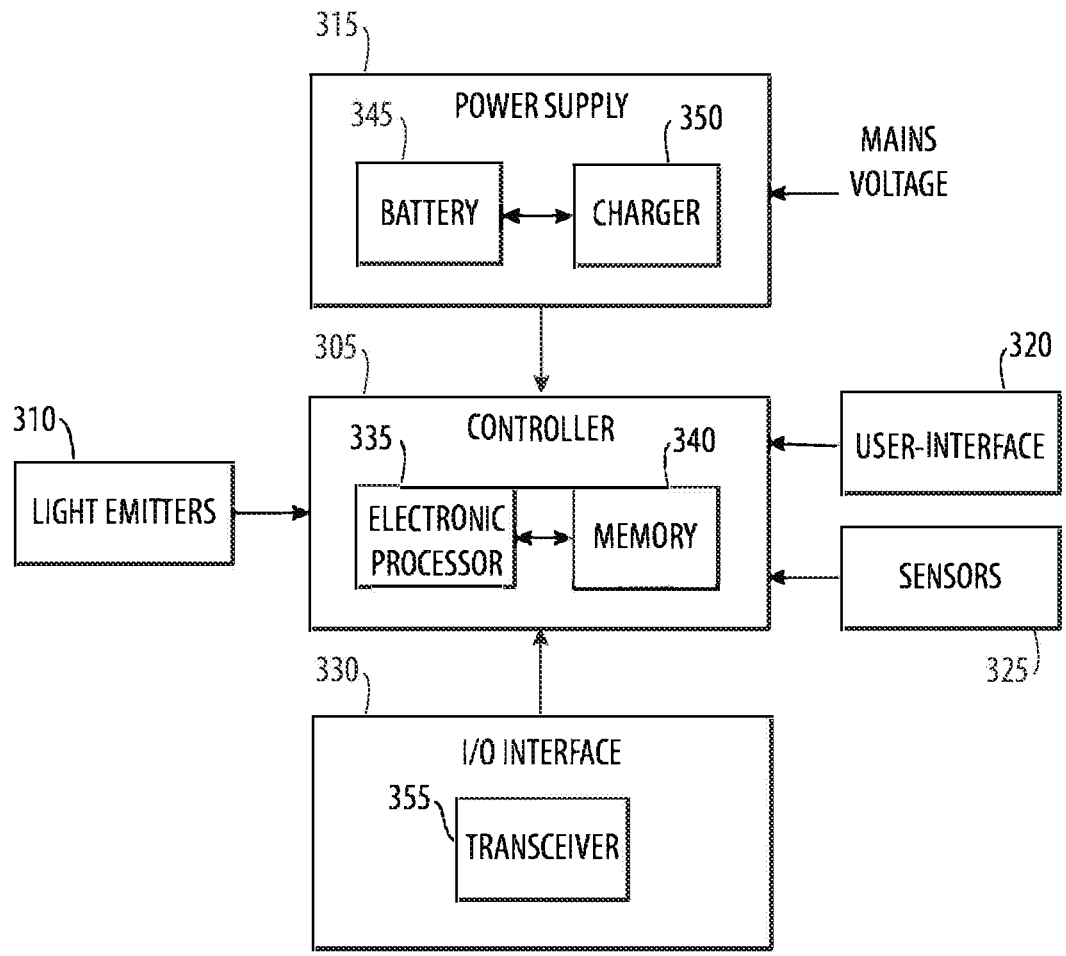
FIG. 3 is a block diagram of a control system of an emergency lighting device included in the emergency lighting system of FIG. 1 according to some embodiments.

FIG. 3 is a block diagram of a control system 300 of an emergency lighting device 105 according to some embodiments. The control system 300 includes a controller 305. The controller 305 is electrically and/or communicatively connected to a variety of modules or components of the emergency lighting device 105. For example, the lighting controller 305 is connected to, among other things, one or more light emitters 310, a power supply 315. a user-interface 320, one or more sensors 325. and an input/output (I/O) interface 330.

In some embodiments, the controller 305 includes a plurality of electrical and electronic components that provide power, operational control, and protection to the components and modules within the controller 305 and/or the cleaning system 100. For example, the controller 305 includes, among other things, an electronic processor 335 (for example, a microprocessor or another suitable programmable device) and a memory 340.

The memory 340 includes, for example, a program storage area and a data storage area. The program storage area and the data storage area can include combinations of different types of memory, such as read-only memory (ROM) and random access memory (RAM). Various non-transitory computer readable media, for example, magnetic, optical, physical, or electronic memory may be used. The electronic processor 335 is communicatively coupled to the memory 340 and executes software instructions that are stored in the memory 340. or stored in another non-transitory computer readable medium such as another memory or a disc. The software may include one or more applications, program data, filters, rules, one or more program modules, and other executable instructions.

The one or more light emitters 310 are configured to provide illumination to an area. The light emitters 310 may be, but are not limited to, incandescent lights, fluorescent lights, halogen lights, metal halide lights, organic light-emitting diodes (OLEDs), and/or light emitting diodes (LEDs). When an emergency lighting device is implemented as a remote lighting, device 200A, the one or more light emitters provide ambient lighting to an area proximate the remote lighting device 200A. When an emergency lighting device 105 is implemented as an emergency exit lighting device 200B, the one or more light emitters 310 are used to illuminate an EXIT sign.

Power supply 315 is configured to receive mains voltage and supply power to the controller 305 and/or other components of the emergency lighting device 105. As shown, the power supply 315 includes a battery 345 and corresponding charger 350. The battery 345 is used for powering the emergency lighting device 105 during an emergency condition (for example, when a power outage of the mains voltage occurs). In some embodiments, the power supply 315 receives power from the area control device 110 (for example, a battery included in the area control device 110) during an emergency condition. In some embodiments, the power supply 315 includes DC-DC converters. AC-DC converters, DC-AC converters, and/or AC-AC converters. In some embodiments, the power supply 315 may receive power from the mains voltage during standard operating conditions.

The user-interface 320 is configured to receive input from a user and/or output information to the user concerning the emergency lighting device 105. In some embodiments, the user-interface 320 includes a display (e.g., the indicators 215A, 215B) for indicating a condition of the emergency lighting device 105. For example, the display may be used to indicate the occurrence of a battery disconnect fault (e.g., battery 345 disconnected from emergency lighting device 105), a weak battery fault (e.g., battery 345 capacity or battery voltage too low), a charger fault, a light emitter fault (e.g., LED string Voltage at or near zero volts), and/or a brown-out condition fault. The display may be for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. In some embodiments, the user-interface 320 includes one or more input devices (for example, touch-screen displays, a plurality of knobs, dials, switches, buttons, etc.).

The one or more sensors 325 sense one or more characteristics of the emergency lighting device 105. In some embodiments, the sensors 325 are temperature sensors configured to sense one or more temperatures of the emergency lighting device 105 (for example, a temperature within a housing of the emergency lighting device 105, an ambient temperature proximate the emergency lighting device 105, a battery temperature, etc.). In other embodiments, the one or more sensors 325 may be electrical sensors configured to monitor one or more electrical characteristics of the emergency lighting device 105. For example, the one or more sensors 325 may monitor an electrical characteristic (for example, voltage, current, power, etc.) of one or more components of the emergency lighting device 105 (for example, the light emitters 310, the user-interface 320, the battery 345, etc.).

The I/O interface 330 may be configured to input and output data from the emergency lighting device 105 to other devices (for example, the area control device 110, the external device 115, the storage device 120, other emergency lighting devices 105, etc.) included in the emergency lighting system 100. As shown in FIG. 3, the I/O interface 330 includes one or more transceivers, hereinafter referred to as "transceiver 355", that allow the I/O interface 330 to input and output data from the emergency lighting device 105 to the area control device 110 and/or other devices in emergency lighting system 100. In some embodiments, the transceiver 355 allows for the I/O interface 330 to communicate using a wired network communication means (for example, ethernet). In some embodiments, the transceiver 355 is a radio transceiver that enables the I/O interface 330 of emergency lighting device 105 to communicate wirelessly with other devices included in the emergency lighting system 100. For example, the transceiver 355 of I/O interface 330 allows for short-range radio communication (for example, Bluetooth®, WiFi®, NFC, ZigBee®, etc.) between the emergency lighting device 105 and other devices included in the emergency lighting system 100. In some embodiments, the transceiver 355 of I/O interface 330 is a radio transceiver that allows for long-range radio communication (e.g., cellular communication over a cellular network) between the emergency lighting device 105 and other devices included in the emergency lighting system 100. Although shown as including a single transceiver 355, it should be understood that the I/O interface 330 of emergency lighting device 105 may include multiple transceiver devices. For example, in some embodiments, the I/O interface 330 may include one transceiver device per method of communication (wired, short-range radio, long-range radio, etc.).

Figure 4:
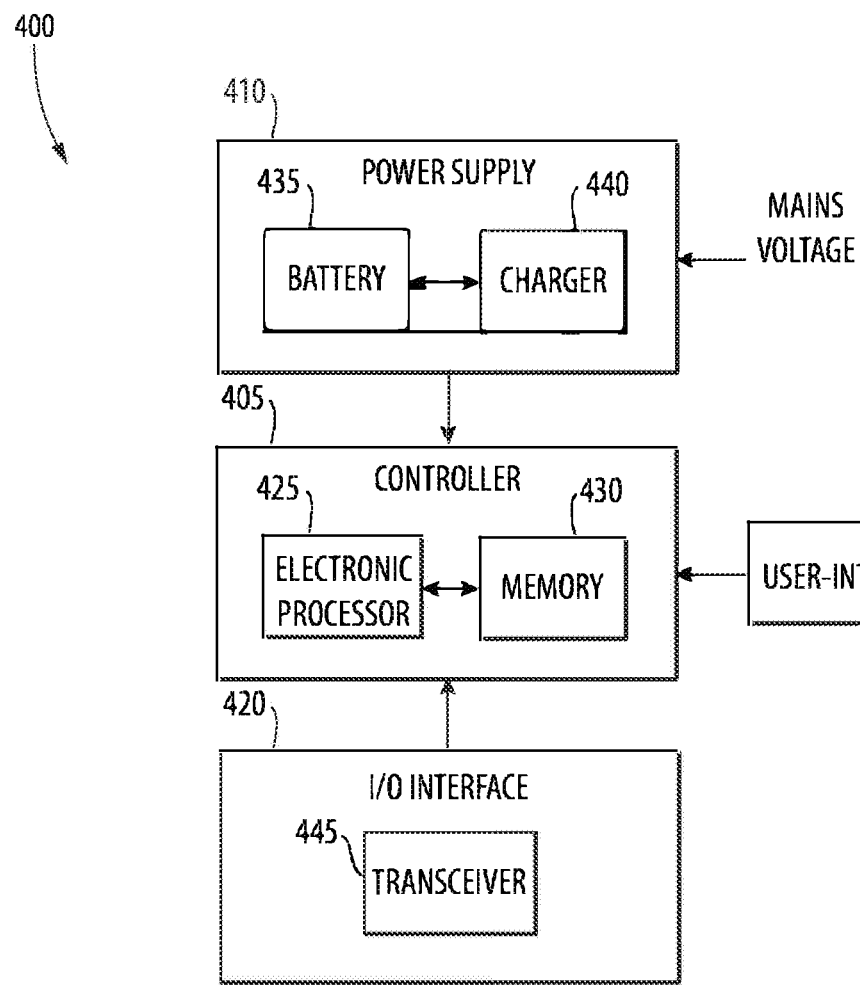
FIG. 4 is a block diagram of a control system of an area control device included in the emergency lighting system of FIG. 1 according to some embodiments.

FIG. 4 is a block diagram of a control system 400 of an area control device 110 according to some embodiments. The control system 400 includes a controller 405. The controller 405 is electrically and/or communicatively connected to a variety of modules or components of the area control device 110. For example, the controller 405 is connected to, among other things, a power supply 410, a user-interface 415, and an I/O interface 420.

In some embodiments, the controller 405 includes a plurality of electrical and electronic components that provide power, operational control, and/or protection to the components and modules within the controller 405 and/or the area control device 110. For example, the controller 405 includes, among other things, an electronic processor 425 (for example, a microprocessor or another suitable programmable device) and a memory 430.

The memory 430 includes, for example, a program storage area and a data storage area. The program storage area and the data storage area can include combinations of different types of memory, such as read-only memory (ROM) and random access memory (RAM). Various non-transitory computer readable media, for example, magnetic, optical, physical, or electronic memory may be used. The electronic processor 425 is communicatively coupled to the memory 430 and executes software instructions that are stored in the memory 430, or stored in another non-transitory computer readable medium such as another memory or a disc. The software may include one or more applications, program data, filters, rules, one or more program modules, and/or other executable instructions.

The power supply 410 is configured to receive mains voltage and supply power to the controller 405, other components of the area control device 110, and/or the emergency lighting device 105. As shown, the power supply 410 includes a battery 435 and corresponding charger 440. The battery 435 is used for powering the area control device 110 and/or emergency lighting devices 105 during an emergency condition (for example, when a power outage of the mains voltage occurs). In some embodiments, the power supply 410 includes DC-DC converters, AC-DC converters, DC-AC converters, and/or AC-AC converters. In other embodiments, the power supply 410 may receive power from the mains voltage (for example, an AC power outlet) during standard operating conditions.

The user-interface 415 is configured to receive input from a user and/or output information to the user concerning the area control device 110 and/or emergency lighting devices 105 to which the area control device 110 is connected. In some embodiments, the user-interface 415 includes a display for indicating a condition of the area control device 110 or emergency lighting devices 105. For example, the display may be used to indicate the occurrence of a battery disconnect fault (e.g., battery disconnected from emergency lighting device), a weak battery fault (e.g., battery capacity or battery voltage too low), a charger fault, an LED driver fault (e.g., LED string voltage at or near zero volts), a light emitter fault, and/or a brown-out condition fault. The display may be, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. In some embodiments, the user-interface 415 includes one or more input devices (for example, touch-screen displays, a plurality of knobs, dials, switches, buttons, etc.).

The I/O interface 420 may be configured to input and output data from the area control device 110 to other devices (for example, the emergency lighting devices 105, the external device 115, the storage device 120, etc.) included in the emergency lighting system 100. As shown in FIG. 4, the I/O interface 420 includes one or more transceivers, hereinafter referred to as "transceiver 445." that allow the I/O interface 420 to input and output data from the control device 110 to the emergency lighting devices 105 and/or other devices in emergency lighting system 100. In some embodiments, the transceiver 445 allows for the I/O interface 420 to communicate using a wired network communication means (for example, ethernet). In some embodiments, the transceiver 445 is a radio transceiver that enables the I/O interface 420 of area control device 110 to communicate wirelessly with other devices included in the emergency lighting system 100. For example, the transceiver 445 of I/O interface 420 may allow for short-range radio communication (e.g., Bluetooth®, WiFi®, ZigBee®, etc.). In some embodiments, the transceiver 445 of I/O interface 420 is a radio transceiver that allows for long-range radio communication (e.g., cellular communication over a cellular network) between the area control device 110 and one or more other devices. Although shown as including a single transceiver 445, it should be understood that the I/O interface 420 of area control device 110 may include multiple transceiver devices. In some embodiments, the I/O interface 420 includes a first transceiver for wired communication between the area control device 110 and the emergency lighting devices 105 to which area control device 110 is attached. In such embodiments, the I/O interface 420 further includes a second transceiver for wireless communication between the area control device 110 and the external device 115 and storage device 120. In some embodiments, the I/O interface 420 may include one transceiver device per method of communication (wired, short-range radio, long-range radio, etc.).

Figure 5:
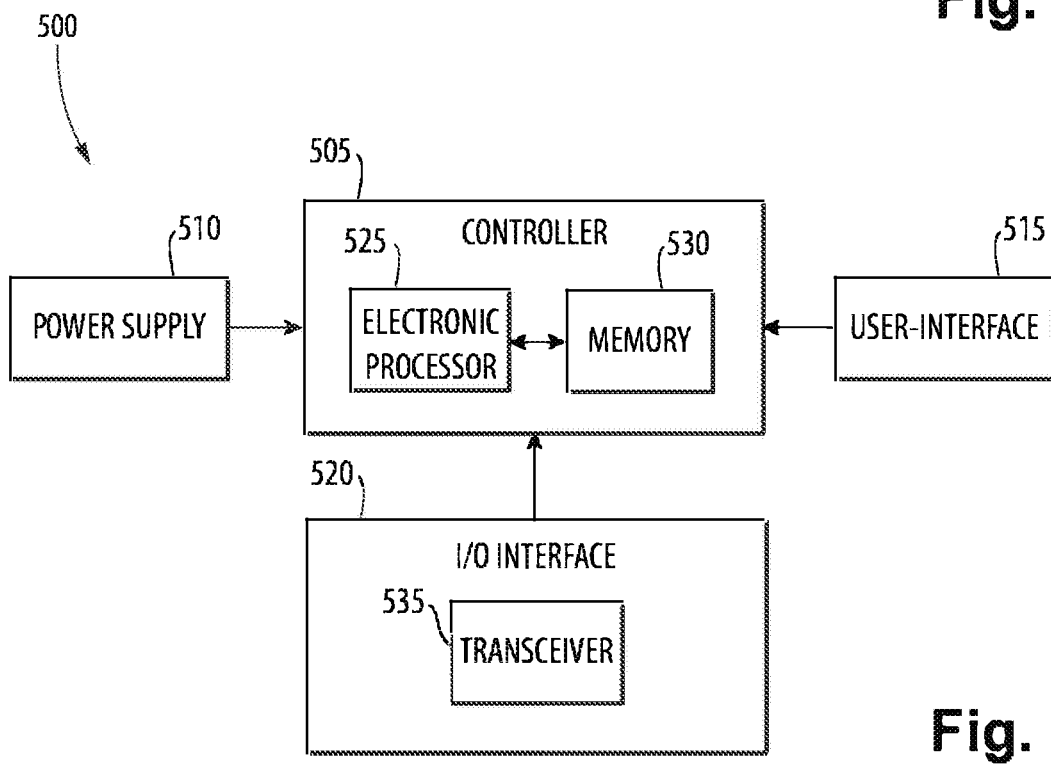
FIG. 5 is a block diagram of a control system of an area external device included in the emergency lighting system of FIG. 1 according to some embodiments.

FIG. 5 is a block diagram of a control system 500 of an external device 115 according to some embodiments. The external device 115 may be, for example, a smartphone, a tablet, a laptop computer, a computer, or any other electronic device capable of communicating with devices included in the emergency lighting network 100. The control system 500 includes a controller 505. The controller 505 is electrically and/or communicatively connected to a variety of modules or components of the external device 115. For example, the controller 505 is connected to, among other things, a power supply 510, a user-interface 515, and an I/O interface 520.

In some embodiments, the controller 505 includes a plurality of electrical and electronic components that provide power, operational control, and protection to the components and modules within the controller 505 and/or the external device 115. For example, the controller 505 includes, among other things, an electronic processor 525 (for example, a microprocessor or another suitable programmable device) and a memory 530.

The memory 530 includes, for example, a program storage area and a data storage area. The program storage area and the data storage area can include combinations of different types of memory, such as read-only memory (ROM) and random access memory (RAM). Various non-transitory computer readable media, for example, magnetic, optical, physical, or electronic memory may be used. The electronic processor 525 is communicatively coupled to the memory 530 and executes software instructions that are stored in the memory 530, or stored in another non transitory computer readable medium such as another memory or a disc. The software may include one or more applications, program data, filters, rules, one or more program modules, and other executable instructions.

The power supply 510 is configured to supply power to the controller 505 and/or other components of the external device 115. In some embodiments, the power supply 510 receives power from a battery and provides regulated power to the controller 505 and/or other components of the external device 115. In some embodiments, the power supply 510 includes DC-DC converters, AC-DC converters, DC-AC converters, and/or AC-AC converters. In other embodiments, the power supply 510 may receive power from an AC power source (for example, an AC power outlet) during standard operating conditions.

The user-interface 515 is configured to receive input from a user and/or output information to the user concerning the external device 115 and/or other devices included in the emergency lighting system 100. The user-interface 515 includes a display (for example, a primary display, a secondary display, etc.) and/or one ore more input devices (for example, touch-screen displays, a plurality of knobs, dials, switches, buttons, etc.). The display may be, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc.

Via the input devices of user-interface 515, a user of the external device 115 may initiate one or more emergency lighting devices 105 to perform a self-diagnostic test. In addition, using the input devices of user-interface 515, a user of the external device 115 may request information associated with the emergency lighting devices 105 from storage device 120 and/or other devices included in the emergency lighting system 100. The display included in user-interface 515 may be configured to present information regarding a self-diagnostic test performed by one or more emergency lighting devices 105. The display included in user-interface 515 may be further configured to display a history of all self-diagnostic tests performed by emergency lighting devices 105 included in the emergency lighting system 100.

The I/O interface 520 may be configured to input and output data from the external device 115 to other devices (for example, the emergency lighting devices 105, the area control device 110, the storage device 120, etc.) included in the emergency lighting system 100. As shown in FIG. 5, the I/O interface 520 includes one or more transceivers, hereinafter referred to as "transceiver 535," that allow the I/O interface 520 to input and output data from the external device 115 to the emergency lighting devices 105, area control device 110, storage device 120 and/or other devices in emergency lighting system 100. In some embodiments, the transceiver 535 allows for the I/O interface 520 to communicate using a wired network communication means (for example, ethernet). In some embodiments, the transceiver 535 is a radio transceiver that enables the I/O interface 520 of external device 115 to communicate wirelessly with other devices included in the emergency lighting system 100. For example, the transceiver 535 of I/O interface 520 may allow for short-range radio communication (e.g., Bluetooth®, WiFi®, ZigBee®, etc.) between the external device 115 and other devices included in the emergency lighting system 100. In some embodiments, the transceiver 535 of I/O interface 520 is a radio transceiver that allows for long-range radio communication (e.g., cellular communication over a cellular network) between the external device 115 and one or more other devices. Although shown as including a single transceiver 535, it should be understood that the I/O interface 520 of external device 115 may include multiple transceiver devices. In some embodiments, the I/O interface 520 may include one transceiver device per method of communication (wired, short-range radio, long-range radio, etc.). In some embodiments, the I/O interface 520 of external device 115 is incapable of directly communicating with the I/O interface 330 of an emergency lighting device. In such embodiments, the I/O interface 520 may communicate with I/O interface 330 by forwarding signals to and from the external device 115 through I/O interface 420 of the area control device 110.

During operation of the emergency lighting system 100, one or more of the plurality of emergency lighting devices 105A-105C may perform a self-diagnostic test. The controller 305 of a particular emergency lighting device 105 is configured to determine whether there are any faults within the emergency lighting device 105 while performing a self-diagnostic test. For example, the controller 305 may be configured to monitor signals received from the one or more sensors 325 to determine whether a battery disconnect fault (e.g., battery 345 disconnected from emergency lighting device 105), a weak battery fault (e.g., battery 345 capacity or battery voltage too low), a charger fault (e.g., charger 350 is disconnected from power supply 315), a light emitter fault (e.g., LED string voltage at or near zero volts), and/or a brown-out condition fault is present. Furthermore, the controller 305 may be configured to perform a self-diagnostic test for various lengths of time. For example, the controller 305 may perform a self-diagnostic test for one minute, thirty minutes, an hour, ninety minutes, etc. If the controller 305 determines that no faults are present in the emergency lighting device 105 during a self-diagnostic test, the controller 305 determines that the self-diagnostic test was successful. If the controller 305 determines that a fault is present in the emergency lighting device 105 during a self-diagnostic test, the controller 305 determines that the self-diagnostic test was unsuccessful.

In some embodiments, the controller 305 of a particular emergency lighting device 105 may be configured to perform a self-diagnostic test according to a predetermined schedule. For example, the controller 305 of emergency lighting device 105 may perform a self-diagnostic test daily, weekly, once every thirty days, monthly, annually, etc. In some embodiments, the controller 305 is configured to perform a self-diagnostic test in response to the I/O interface 330 receiving a signal. For example, the controller 305 may perform a self-diagnostic test in response to the I/O interface 330 receiving a signal from the area control device 110. The controller 305 may be further configured to perform a self-diagnostic test in response to the I/O interface 330 receiving a signal generated by the external device 115. For example, a user of the external device 115 may select, using the user-interface 515, a particular emergency lighting device 105 from the plurality of emergency lighting devices 105A-105C to perform a self-diagnostic test. Accordingly, the I/O interface 520 may transmit a self-diagnostic request signal to the I/O interface 420 of area control device 110, which forwards the request signal to the I/O interface 330 of the particular emergency lighting device 105. The I/O interface 520 may send the self-diagnostic request signal directly to the I/O interface 330 or to the I/O interface 420 of area control device 110, which is configured to forward the request signal to the I/O interface 330 of emergency lighting device 105. In some embodiments, each of the plurality of emergency lighting devices 105A-105C are configured to perform a self-diagnostic test at the same time. For example, a user of the external device 115 is operable to issue a "mass self-diagnostic test," which causes each of the plurality of emergency lighting devices 105A-105C to perform a self-diagnostic test. In some embodiments, each of the plurality of emergency lighting devices 105A-105C are configured to perform a self-diagnostic test at separate times.

After the controller 305 completes the self-diagnostic test, the I/O interface 330 is configured to transmit a signal including data associated with the self-diagnostic test for storage at the storage device 120. The storage device 120 may be, for example, a cloud-based database, a remote database, a local database, or even a local storage device (e.g., a memory). The data associated with the self-diagnostic test may include information such as the date and start time of the self-diagnostic test, the length of the self-diagnostic test, a result of the self-diagnostic test (for example, whether the self-diagnostic test was successful), a type of fault that occurred during the self-diagnostic test (for example, battery fault, charger fault, etc.), status of the emergency lighting devices 105 (for example, emergency condition present or no emergency condition present), etc.

In some embodiments, the I/O interface 330 is configured to transmit the signal including data associated with the self-diagnostic test directly to the remote storage device 120. In some embodiments, the I/O interface 330 is configured to transmit the signal including data associated with the self-diagnostic test directly to the external device 115. In some embodiments, the I/O interface 330 is configured to transmit the signal including data associated with the self-diagnostic test to the area control device 110, which is configured to forward the signal including data associated with the self-diagnostic test to the storage device 120 and/or external device 115. The data associated with the self-diagnostic test is stored at the storage device 120 with an identifier associated with the emergency lighting device 105 that performed the self-diagnostic test (for example, "emergency storage device 105A"). In some embodiments, the controller 305 of the emergency lighting device 105 is configured to store data associated with the self-diagnostic test locally in memory 340.

In addition to storing data associated with a particular self-diagnostic test, the storage device 120 is configured to maintain a record of data associated with all, or substantially all, self-diagnostic tests, status updates, fault conditions, and/or other events that have occurred in the emergency lighting system 100. For example, a status of a particular emergency lighting device 105, which indicates whether the emergency lighting device 100 is operating in an emergency condition, may be retrieved stored at the storage device 120. A user of an external device 115 can retrieve, from the storage device 120, the data stored at the remote storage device 120 upon request. For example, a user of the external device 115 can select, via the user-interface 515, which information is to be retrieved from the storage device 120. A user can select to retrieve data associated with a particular emergency lighting device 105, data associated with multiple emergency lighting devices 105A-105C, data associated with a particular self-diagnostic test that was performed, data associated with the history of all self-diagnostic tests that were performed within a defined time period, and the like.

Upon a user selection of which data should be retrieved from the storage device 120, the I/O interface 520 of external device 115 transmits a data request signal to the storage device 120. Accordingly, the storage device 120 receives the data request signal and transmits a signal including the requested data to the external device 115. The requested data may be formatted in a report that is presented to the user on display of the user-interface 515 of external device 115.

Figure 6:
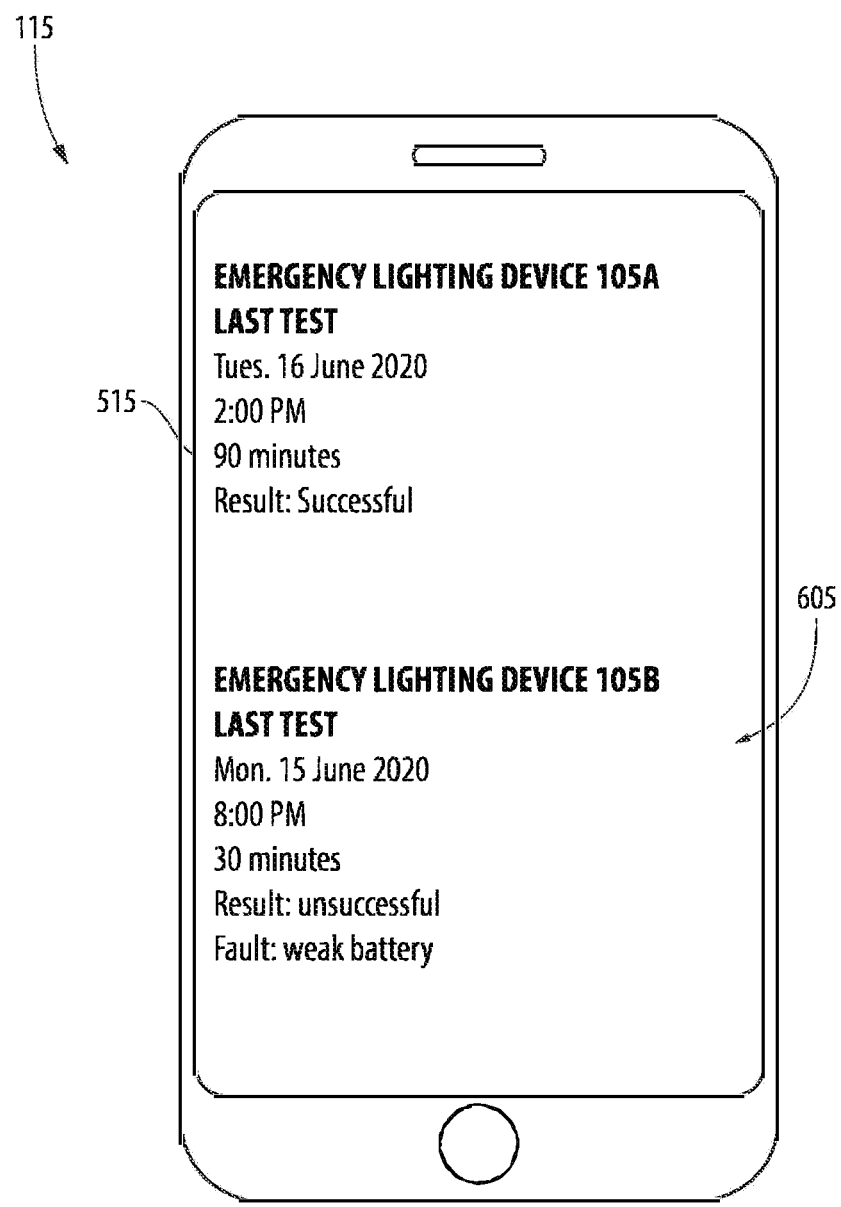
FIG. 6 is a block diagram of an external device included in the emergency lighting system of FIG. 1 according to some embodiments.

FIG. 6 illustrates an example of a data report 605 that is displayed on the user-interface 515 of the external device 115. As shown, the data report includes information associated with one or more self-diagnostic tests that were recently performed by emergency lighting devices 105A and 105B. For example, the data report 605 includes information associated with the date (Tues. 16 Jun. 2020), the start time (2:00 PM), the duration (90 minutes), and the result (successful) of the most recent self-diagnostic test performed by emergency lighting device 105A. Furthermore, the data report 605 includes information associated with the date (Mon. 15 Jun. 2020), the start time (8:00 PM), the duration (30 minutes), the result (unsuccessful), and a fault that occurred (weak battery) during the self-diagnostic test performed by emergency lighting device 105B. It should be understood that although the data report 605 shown in FIG. 6 includes information associated with emergency lighting devices 105A and 105B, the data report 605 shown in FIG. 6 is not in any way limiting, of the type and/or amount of information that may be included in a data report. For example, a data report may include more or less information than what is shown in FIG. 6. Furthermore, a data report may include information associated with any self-diagnostic test that was performed by an emergency lighting device 105, not just information associated with a recent self-diagnostic test that was performed by the emergency lighting device 105.

Figure 7:
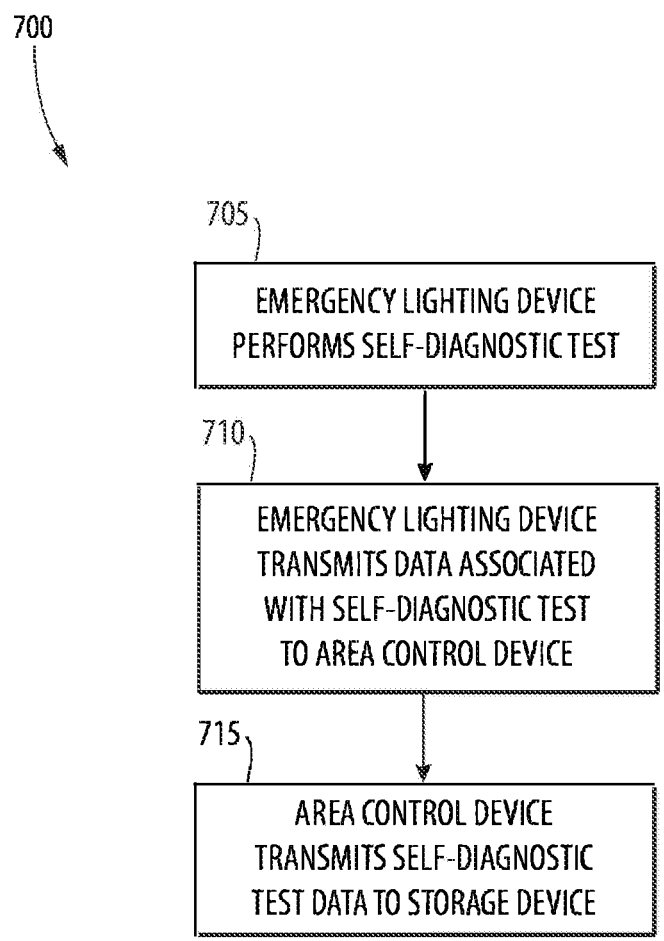
FIG. 7 is a flow chart illustrating a process or operation of the emergency lighting system of claim 1 according to some embodiments.
Figure 8:
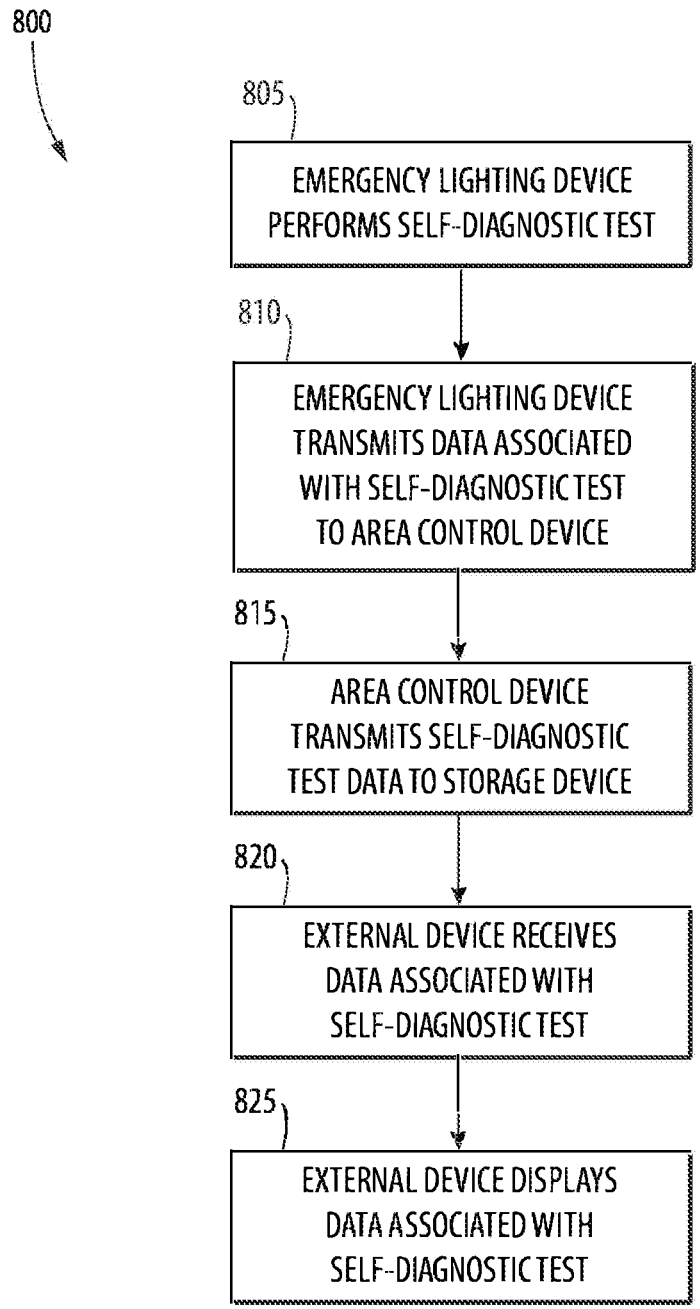
FIG. 8 is a flow chart illustrating a process or operation of the emergency lighting system of claim 1 according, to some embodiments.

FIG. 7 is a flow chart illustrating a process, or operation, 700 of the emergency lighting system 100 according to some embodiments. It should be understood that the order of the steps disclosed in process 700 could vary. Furthermore, additional steps may be added to the process 700. Process 700 begins with the controller 305 of emergency lighting device 105A performing a self-diagnostic test (block 705). The I/O interface 330 of emergency lighting device 105 transmits data associated with the self-diagnostic test to the I/O interface 420 of area control device 110 (block 710). The I/O interface 420 transmits the data associated with the self-diagnostic test to the storage device 120 (block 715), FIG. 8 is a flow chart illustrating, a process, or operation, 800 of the emergency lighting system 100 according to some embodiments. It should be understood that the order of the steps disclosed in process 800 could vary. Furthermore, additional steps may be added to the process 800. Process 800 begins with the controller 305 of emergency lighting device 105A performing a self-diagnostic test (block 805). The I/O interface 330 of emergency lighting device 105 transmits data associated with the self-diagnostic test to the I/O interface 420 of area control device 110 (block 810). The I/O interface 420 transmits the data associated with the self-diagnostic test to the storage device 120 (block 815). The I/O interface 520 of the external device 115 receives the data associated with the self-diagnostic test from the storage device 120 (block 820). The external device displays, using the user-interface 515, data associated with the self-diagnostic test (block 825).

Figure 9:
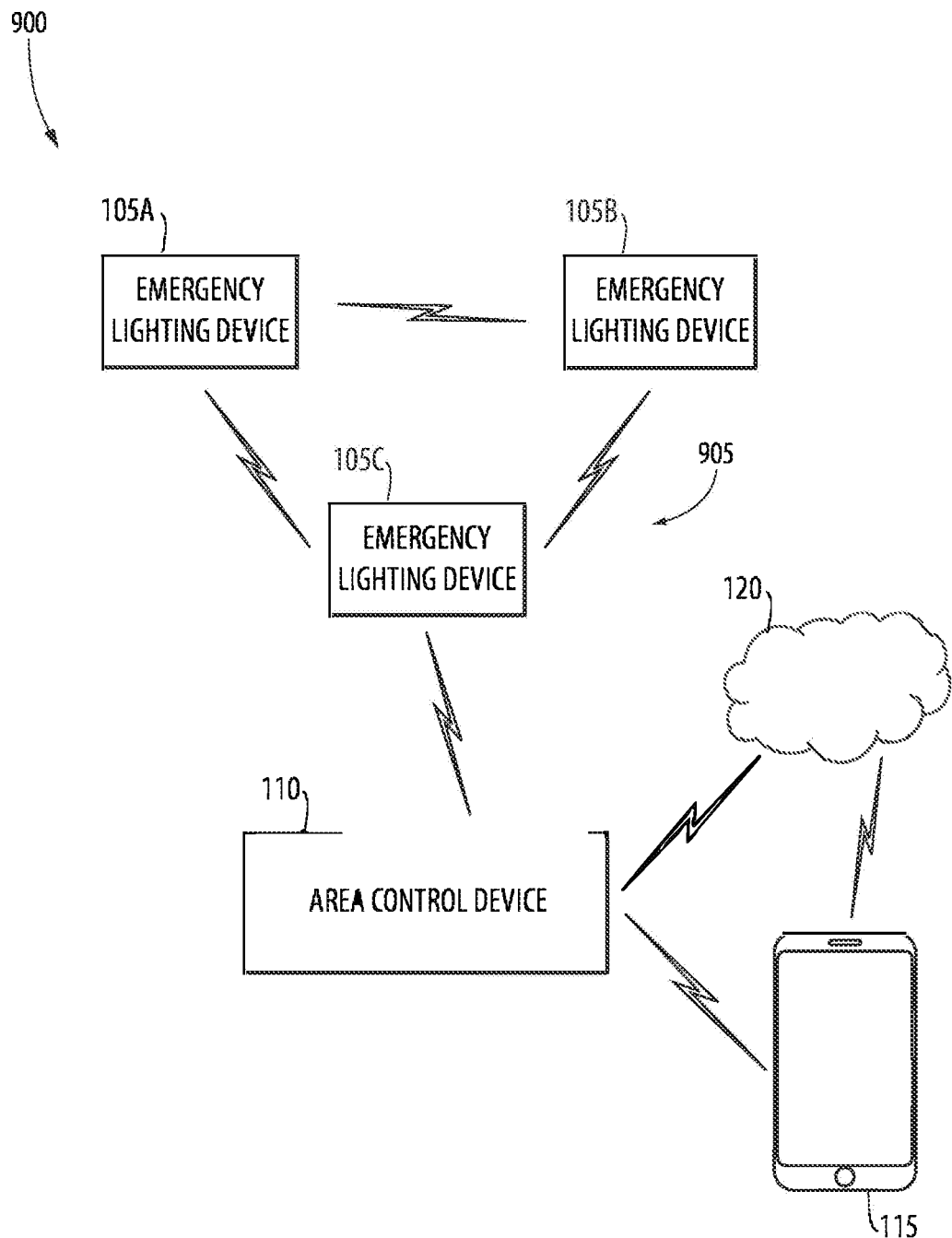
FIG. 9 is a schematic view of an emergency lighting system according to some embodiments.

FIG. 9 is a schematic view of an emergency lighting system 900 according to some embodiments. Emergency lighting system 900 may have a similar configuration to that of the emergency lighting system 100 illustrated in FIG. 1; however, the plurality of emergency lighting devices 105A-105C included in emergency lighting system 900 may be further configured to wirelessly communicate with one another using a mesh network 905. As indicated by the wireless communication signals (lightning bolts) shown in FIG. 9, the emergency lighting devices 105A-105C are configured to wirelessly communicate with one another. In particular, the emergency lighting devices 105A-105C are configured to wirelessly communicate with one another using short-range radio communication (for example, Bluetooth®, WiFi®, ZigBee®, etc.).

Using the mesh network 905, the area control device 110 is able to wirelessly communicate with any particular emergency lighting device 105 included in the emergency lighting system 900, even if said particular emergency lighting device 105 is not within communication range of the area control device 110. For example, it will be assumed that emergency lighting device 105A is not within communication range of the area control device 110. It Will further be assumed that emergency lighting device 105A is within communication range of emergency lighting device 1050, and emergency lighting device 105C is within communication range of area control device 110. Accordingly, if area control device 110 receives a request to initiate a self-diagnostic test in emergency lighting device 105A from the external device 115, the area control device 110 can forward, through the I/O interface 330C of emergency lighting device 105C, the request to initiate a self-diagnostic test to the I/O interface 330A emergency lighting device 105A. Accordingly, upon receipt of the request to perform a self-diagnostic test, the controller 305A of emergency lighting device 105A performs the self-diagnostic test. The I/O interface 330A of emergency lighting device 105A then forwards, through the I/O interface 330B of emergency lighting device 1050, data associated with the self-diagnostic test to the area control device 110.

In a similar manner to the example described above, the area control device 110 is further configured to retrieve additional information from the mesh network 905 regarding the plurality of emergency lighting devices 105A-105C. For example, the area control device 110 may be configured to retrieve information associated with the status of a particular emergency lighting device 105, location of a particular emergency lighting device 105, and/or sensor information from a particular emergency lighting device 105 using the mesh network 905. In some embodiments, the area control device 110 can estimate the location of a particular emergency lighting device 105 based on a strength of signal received from the I/O interface 330 of a particular emergency lighting device 105.

The area control device 110 is further configured to initiate a self-diagnostic test in a particular emergency lighting device 105 either directly or indirectly through other emergency lighting devices 105 included in the mesh network 905. As described above, any information associated with the plurality of emergency lighting devices 105A-105C (for example, self-diagnostic tests, status, location, etc.) may be transmitted by the area control device 110 to the external device 115 and/or storage device 120.

Figure 10:
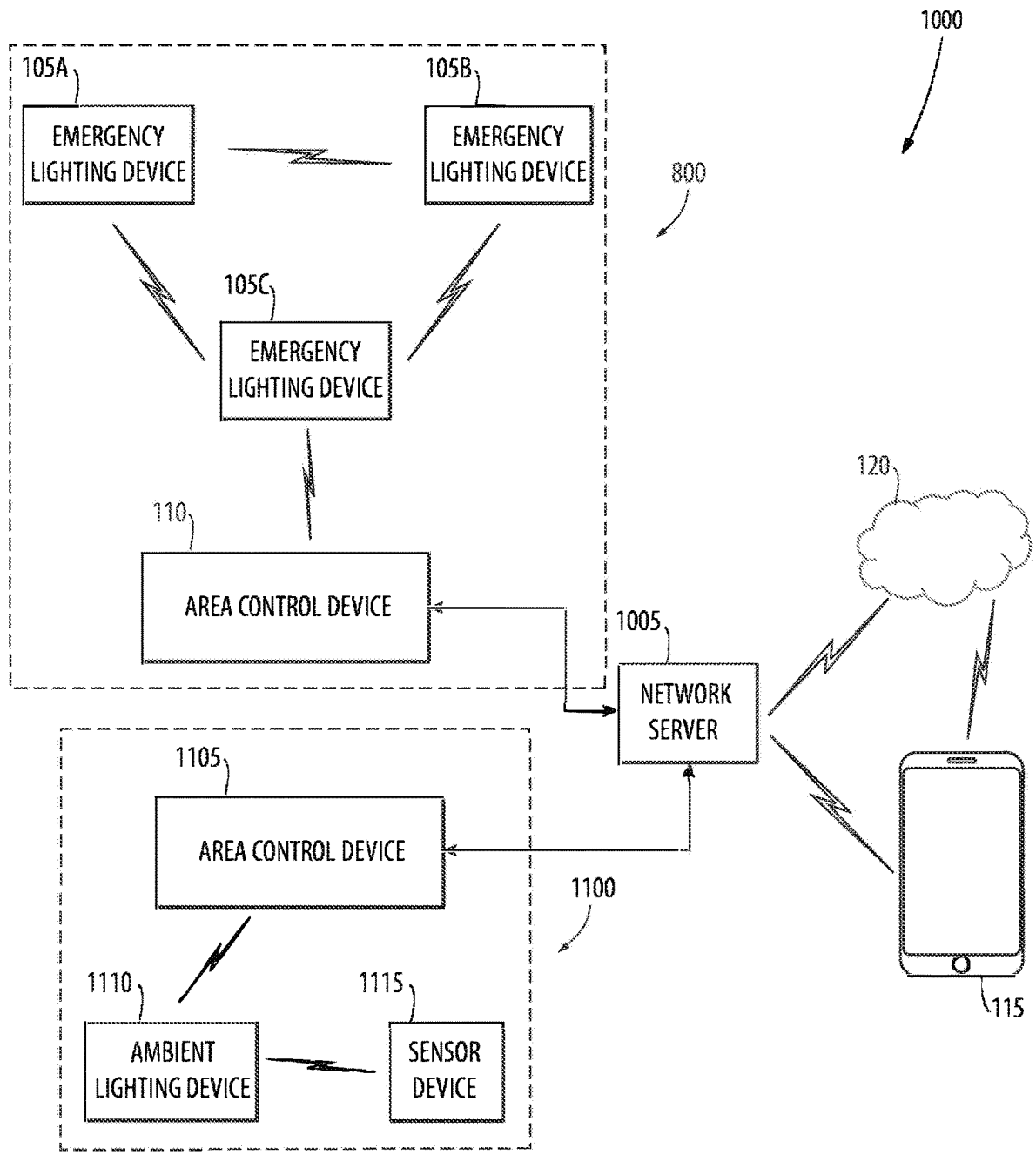
FIG. 10 is a schematic view of a lighting system according to some embodiments.

FIG. 10 is a schematic view of a lighting system 1000. The lighting system 1000 includes, among other things, the components included in emergency lighting system 900, a network server 1005, and an ambient lighting system 1100, which includes an area control device 1105, an ambient lighting device 1110, and a sensor device 1115. Using the methods described above with respect to emergency lighting systems 100 and 900 (including but not limited to use of a mesh network), a user of the external device 115 included in lighting system 1000 can control and receive data associated with emergency lighting devices 105A-105C. However, a user of the external device 115 may further be able to control and retrieve data associated with ambient lighting devices 1110 and sensor devices 1115 included in the ambient lighting system 1100, For example, data associated with operating conditions of the ambient lighting devices 1110 and sensor devices 1115 may be transmitted to the storage device 120 (for example, by area control device 1105 and/or network server 1005) and retrieved from the storage device 120 by I/O interface 520 of the external device. Similarly, a user of the external device 115 is able to control operation of (for example, turn off, dim, brighten, set scheduling, etc.) the ambient lighting devices 1110 and/or sensor devices 1115 included in the ambient lighting system 1100. Accordingly, lighting system 1000 is a comprehensive system that provides a user of an external device with control and access of data associated with emergency lighting devices 105, ambient lighting devices 1110, and sensor devices 1115.

Embodiments provide, among other things, an emergency lighting system. Various features and advantages of the application are set forth in the following claims.

The invention claimed is:

1. An emergency lighting system comprising:
   an external device;
   a plurality of emergency lighting devices, wherein each emergency lighting device comprises a light, a controller having an electronic processor configured to perform a self-diagnostic test, and an input/output (I/O) device configured to transmit data associated with the self-diagnostic test, and wherein each of the plurality of emergency lighting devices are configured to wirelessly communicate with one another using a short-range radio communication protocol; and
   an area control device comprising an area control I/O device configured to wirelessly receive data associated with the self-diagnostic test from at least one of the plurality of emergency lighting devices, and configured to wirelessly transmit the data associated with the self-diagnostic test of any of the plurality of emergency lighting devices to the external device.

2. The emergency lighting system of claim 1, wherein the external device comprises a user-interface configured to display the data associated with the self-diagnostic test.

3. The emergency lighting system of claim 1, wherein at least one controller of the plurality of emergency lighting devices is configured to perform the self-diagnostic test according to a predetermined schedule.

4. The emergency lighting system of claim 1, wherein a first I/O device of a first emergency lighting device is further configured to wirelessly receive a signal from a second I/O device of a second emergency lighting device of the plurality of lighting devices, and a first controller of the first emergency lighting device is further configured to perform the self-diagnostic test after receiving the signal.

5. The emergency lighting system of claim 4, wherein the second emergency lighting device wirelessly transmits the signal to the first emergency lighting device after receiving a request signal from the area control device.

6. The emergency lighting system of claim 5, wherein the area control device transmits the request signal to the second emergency lighting device after receiving an initial request signal from the external device.

7. The emergency lighting system of claim 1, wherein the area control device is further configured to retrieve additional information concerning at least one of the plurality of emergency lighting devices.

8. The emergency lighting system of claim 7, wherein the additional information comprises at least one of a status of at least one of the plurality of emergency lighting devices, a location of at least one of the plurality of emergency lighting devices, and sensor information from at least one of the plurality of emergency lighting devices.

9. The emergency lighting system of claim 1, wherein the area control device is configured to estimate the location of a particular emergency lighting device of the plurality of emergency lighting devices based on a strength of a signal received from an I/O interface of the particular emergency lighting device.

10. The emergency lighting system of claim 1, wherein the short-range communication protocol utilized by the plurality of emergency lighting devices comprises one of Bluetooth®, WiFi®, near-field communication (NFC), or ZigBee®.

11. A method of operating an emergency lighting system comprising:
wirelessly receiving, by an area control device comprising an area control input/output (I/O) device, data associated with a self-diagnostic test from at least one of a plurality of emergency lighting devices, wherein each emergency lighting device comprises:
a light,
a controller having an electronic processor configured to perform the self-diagnostic test, and
an input/output (I/O) device configured to transmit data associated with the self-diagnostic test, and wherein each of the plurality of emergency lighting devices are configured to wirelessly communicate with one another using a short-range radio communication protocol; and
wirelessly transmitting, by the area control device via the area control I/O device, the data associated with the self-diagnostic test of any of the plurality of emergency lighting devices to an external device.

12. The method of claim 11, wherein the external device comprises a user-interface and further comprising displaying, by the external device, the data associated with the self-diagnostic test.

13. The method of claim 11, further comprising performing, by the controller of at least one of the plurality of emergency lighting devices, the self-diagnostic test according to a predetermined schedule.

14. The method of claim 11, further comprising:
wirelessly receiving, by a first I/O device of a first emergency lighting device of the plurality of emergency lighting devices, a signal from a second I/O device of a second emergency lighting device of the plurality of lighting devices; and
performing, by a first controller of the first emergency lighting device, the self-diagnostic test after receiving the signal.

15. The method of claim 14, prior to wirelessly receiving the signal, further comprising:
wirelessly receiving, by the second I/O device of second emergency lighting device, a request signal from the area control device; and
wirelessly transmitting, by the second I/O device of the second emergency lighting device, the signal to the first emergency lighting device.

16. The method of claim 15, prior to receiving the request signal, further comprising:
receiving, by the area control device, an initial request signal from the external device;
transmitting, by the area control device, the request signal to the second emergency lighting device.

17. The method of claim 11, further comprising wirelessly retrieving, by the area control device, additional information concerning at least one of the plurality of emergency lighting devices.

18. The method of claim 17, wherein the additional information comprises at least one of a status of at least one of the plurality of emergency lighting devices, a location of at least one of the plurality of emergency lighting devices, and sensor information from at least one of the plurality of emergency lighting devices.

19. The method of claim 11, further comprising estimating, by the area control device, the location of a particular emergency lighting device of the plurality of emergency lighting devices based on a strength of a signal received from an I/O interface of the particular emergency lighting device.

20. The method of claim 11, wherein the short-range communication protocol utilized by the plurality of emergency lighting devices comprises one of Bluetooth®, WiFi®, near-field communication (NFC), or ZigBee®.

* * * * *